US010142218B2

(12) United States Patent
Cowart et al.

(10) Patent No.: US 10,142,218 B2
(45) Date of Patent: *Nov. 27, 2018

(54) HYPERVISOR ROUTING BETWEEN NETWORKS IN A VIRTUAL NETWORKING ENVIRONMENT

(75) Inventors: Robert Cowart, Atlanta, GA (US); David Hadas, Zichron Yaakov (IL); Daniel J. Martin, Pawling, NY (US); Bruce Ratcliff, Red Hook, NY (US); Renato Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 895 days.

This patent is subject to a terminal disclaimer.

(21) Appl. No.: 13/006,614

(22) Filed: Jan. 14, 2011

(65) Prior Publication Data

US 2012/0182992 A1    Jul. 19, 2012

(51) Int. Cl.
| H04L 12/707 | (2013.01) |
| H04L 12/775 | (2013.01) |
| H04L 12/723 | (2013.01) |
| H04L 29/06 | (2006.01) |
| H04L 12/935 | (2013.01) |
| H04L 12/741 | (2013.01) |

(52) U.S. Cl.
CPC .............. *H04L 45/22* (2013.01); *H04L 45/50* (2013.01); *H04L 45/74* (2013.01); *H04L 49/3009* (2013.01); *H04L 69/22* (2013.01); *H04L 45/58* (2013.01)

(58) Field of Classification Search
CPC .................................. H04L 45/22; H04L 45/58
See application file for complete search history.

(56) References Cited

U.S. PATENT DOCUMENTS

| 5,949,753 A * | 9/1999 | Alexander et al. ........... 370/216 |
| 6,295,276 B1 | 9/2001 | Datta et al. |
| 7,054,276 B2 | 5/2006 | Kaplan |
| 7,283,534 B1 * | 10/2007 | Kelly et al. ............... 370/395.54 |
| 7,561,571 B1 * | 7/2009 | Lovett et al. .................. 370/392 |
| 7,613,836 B2 * | 11/2009 | Tober et al. ................... 709/250 |
| 7,685,281 B1 * | 3/2010 | Saraiya et al. ................ 709/226 |

(Continued)

OTHER PUBLICATIONS

Hadas, David et al., U.S. Appl. No. 12/623,327, Non-Final Office Action dated Mar. 16, 2011.

(Continued)

*Primary Examiner* — Alpus H Hsu
*Assistant Examiner* — Hooman Houshmand
(74) *Attorney, Agent, or Firm* — Brian F. Russell; Steven L. Bennett

(57) ABSTRACT

A physical host executes a virtual machine monitor (VMM) that instantiates a source virtual machine (VM). In response to the VMM receiving from the source VM a packet specifying a first destination address of a destination VM and a second destination address of a default gateway, the VMM determines whether the packet can be communicated to the destination VM without the packet being routed by the default gateway. In response to the VMM determining that the packet can be communicated to the destination VM without the packet being routed by the default gateway, the VMM forwards the packet to the destination VM such that the packet bypasses routing by the default gateway.

26 Claims, 8 Drawing Sheets

(56) References Cited

U.S. PATENT DOCUMENTS

| | | | |
|---|---|---|---|
| 7,797,699 | B2 | 9/2010 | Kagi et al. |
| 7,802,000 | B1 | 9/2010 | Huang et al. |
| 7,881,208 | B1* | 2/2011 | Nosella et al. .............. 370/242 |
| 8,234,640 | B1 | 7/2012 | Fitzgerald et al. |
| 8,300,641 | B1* | 10/2012 | Vincent et al. .............. 370/392 |
| 8,533,320 | B2 | 9/2013 | Tsirkin |
| 8,611,349 | B1* | 12/2013 | Judge et al. .................. 370/392 |
| 8,612,627 | B1* | 12/2013 | Brandwine .................. 709/240 |
| 8,621,627 | B1 | 12/2013 | Eiriksson et al. |
| 9,086,917 | B1 | 7/2015 | Fitzgerald et al. |
| 2002/0009078 | A1 | 1/2002 | Wislon et al. |
| 2003/0153328 | A1* | 8/2003 | Booth .................. H04W 12/12 455/456.1 |
| 2003/0182421 | A1 | 9/2003 | Faybishenko et al. |
| 2005/0080869 | A1* | 4/2005 | Bender et al. ................ 709/212 |
| 2005/0238035 | A1 | 10/2005 | Riley |
| 2005/0289246 | A1* | 12/2005 | Easton et al. ..................... 710/1 |
| 2006/0002369 | A1 | 1/2006 | Dowker |
| 2006/0174017 | A1* | 8/2006 | Robertson .................... 709/229 |
| 2006/0221961 | A1 | 10/2006 | Basso et al. |
| 2007/0053353 | A1 | 3/2007 | Lee et al. |
| 2007/0186060 | A1 | 8/2007 | Nayyar et al. |
| 2008/0002586 | A1 | 1/2008 | Sahita et al. |
| 2008/0084888 | A1 | 4/2008 | Yadav et al. |
| 2008/0117910 | A1 | 5/2008 | Page |
| 2008/0240122 | A1 | 10/2008 | Richardson et al. |
| 2008/0301473 | A1* | 12/2008 | Perez et al. ................... 713/300 |
| 2009/0006755 | A1 | 1/2009 | Illikkal et al. |
| 2009/0083445 | A1 | 3/2009 | Ganga |
| 2009/0135729 | A1 | 5/2009 | Saffre |
| 2009/0248846 | A1 | 10/2009 | Cohn |
| 2010/0083247 | A1 | 4/2010 | Kanevsky et al. |
| 2010/0107162 | A1* | 4/2010 | Edwards et al. .................. 718/1 |
| 2010/0153945 | A1 | 6/2010 | Bansal et al. |
| 2010/0226368 | A1 | 9/2010 | Mack-Crane et al. |
| 2010/0275199 | A1 | 10/2010 | Smith et al. |
| 2011/0075667 | A1 | 3/2011 | Li et al. |
| 2011/0126110 | A1 | 5/2011 | Vilke et al. |
| 2011/0206047 | A1* | 8/2011 | Donthamsetty et al. ..... 370/392 |
| 2011/0243142 | A1 | 10/2011 | Kwon et al. |
| 2011/0255538 | A1* | 10/2011 | Srinivasan et al. ........... 370/392 |
| 2011/0299534 | A1 | 12/2011 | Koganti et al. |
| 2011/0310899 | A1* | 12/2011 | Alkhatib et al. .............. 370/392 |
| 2011/0314469 | A1 | 12/2011 | Qian et al. |
| 2012/0167082 | A1 | 6/2012 | Kumar et al. |

OTHER PUBLICATIONS

Hadas, David et al., U.S. Appl. No. 12/623,327, Final Office Action dated Aug. 19, 2011.

Hadas, David et al., U.S. Appl. No. 12/623,327, Notice of Allowance dated Oct. 28, 2011.

Hadas, David et al., U.S. Appl. No. 13/006,836, Non-Final Office Action dated Oct. 5, 2012.

Hadas, David et al., U.S. Appl. No. 13/006,758, Non-Final Office Action dated Feb. 1, 2013.

Cowart, Robert et al., U.S. Appl. No. 13/456,476, Non-Final Office Action dated Jul. 17, 2015.

Cowart, Robert et al., U.S. Appl. No. 13/456,476, Final Office Action dated Feb. 2, 2016.

Cowart, Robert et al., U.S. Appl. No. 13/456,476, Notice of Allowance dated Aug. 14, 2018.

Hadas, David et al., U.S. Appl. No. 13/006,758, Final Office Action dated Sep. 19, 2013.

Hadas, David et al., U.S. Appl. No. 13/006,758, Advisory Action dated Nov. 27, 2013.

Hadas, David et al., U.S. Appl. No. 13/006,758, Final Office Action dated Oct. 22, 2014.

Hadas, David et al., U.S. Appl. No. 13/006,758, Non-Final Office Action dated Jul. 22, 2015.

Hadas, David et al., U.S. Appl. No. 13/006,758, Final Office Action dated Jan. 14, 2016.

Hadas, David et al., U.S. Appl. No. 13/006,758, Examiners Answer dated Nov. 18, 2016.

Hadas, David et al., U.S. Appl. No. 13/006,758, Decision on Appeal dated Feb. 2, 2018.

Hadas, David et al., U.S. Appl. No. 13/006,758, Non-Final Office Action dated Aug. 2, 2018.

Hadas, David et al., U.S. Appl. No. 13/456,683, Non-Final Office Action dated Jul. 1, 2015.

Hadas, David et al., U.S. Appl. No. 13/456,683, Final Office Action dated Jan. 13, 2016.

Hadas, David et al., U.S. Appl. No. 13/456,683, Examiners Answer dated Nov. 18, 2016.

Hadas, David et al., U.S. Appl. No. 13/456,683, Decision on Appeal Feb. 2, 2018.

Hadas, David et al., U.S. Appl. No. 13/456,683, Non-Final Office Action dated Aug. 2, 2018.

* cited by examiner

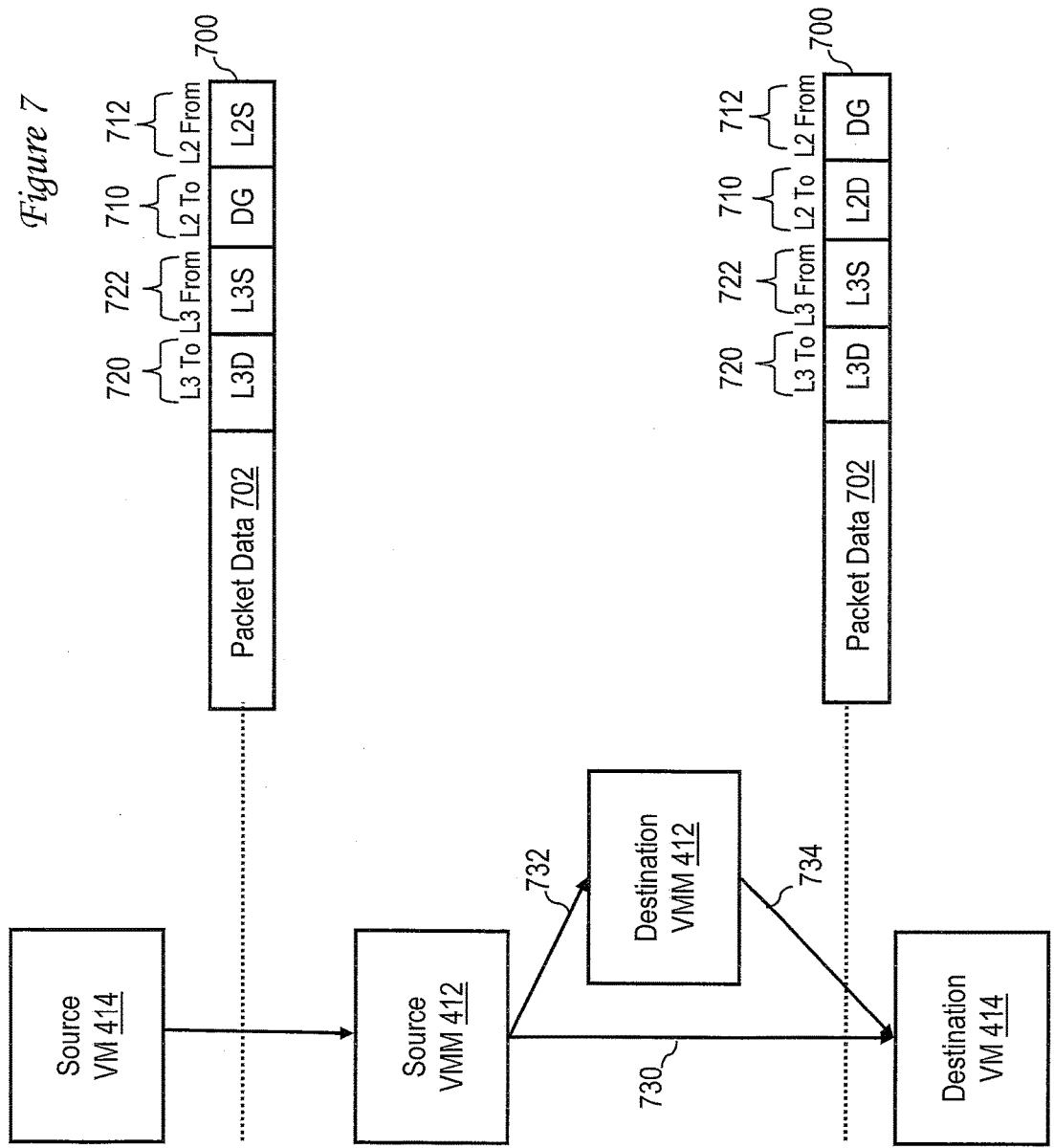

HYPERVISOR ROUTING BETWEEN NETWORKS IN A VIRTUAL NETWORKING ENVIRONMENT

CROSS-REFERENCE TO RELATED APPLICATIONS

The present application is related to copending U.S. patent application Ser. No. 12/623,327, filed Nov. 20, 2009; U.S. patent application Ser. No. 13/006,758, filed concurrently; and U.S. patent application Ser. No. 13/006,836, filed concurrently; all of which are incorporated herein by reference.

BACKGROUND OF THE INVENTION

1. Technical Field

The present invention relates in general to data processing, and in particular, to data processing environments including virtual networks.

2. Description of the Related Art

In general, "utility computing" refers to a computational model in which processing, storage and network resources, software, and data are accessible to client computer systems and other client devices (e.g., mobile phones or media players) on demand, much like familiar residential utility services, such as water and electricity. In some implementations, the specific computational resources (e.g., servers, storage drives, etc.) allocated for access and use by client devices are specified by service agreements between the utility computing provider and its customers. In other implementations, commonly referred to as "cloud computing," details of the underlying information technology (IT) infrastructure are transparent to the utility computing customers.

Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of utility computing has been facilitated by the widespread utilization of virtualization, which is the creation of virtual (rather than actual) versions of computing resource, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, AIX, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different utility computing customers.

The virtualization of actual IT resources and management of VMs is typically provided by software referred to as a VM monitor (VMM) or hypervisor. In various implementations, a VMM may run on bare hardware (Type 1 or native VMM) or on top of an operating system (Type 2 or hosted VMM).

In a typical virtualized computing environment, VMs can communicate with each other and with physical entities in the IT infrastructure of the utility computing environment utilizing conventional networking protocols. As is known in the art, conventional networking protocols are commonly premised on the well known seven layer Open Systems Interconnection (OSI) model, which includes (in ascending order) physical, data link, network, transport, session, presentation and application layers. VMs are enabled to communicate with other network entities as if the VMs were physical network elements through the substitution of a virtual network connection for the conventional physical layer connection. Disclosed herein are techniques for enhancing VM data communication via virtual networks.

SUMMARY OF THE INVENTION

In some embodiments, a physical host executes a virtual machine monitor (VMM) that instantiates a source virtual machine (VM). In response to the VMM receiving from the source VM a packet specifying a first destination address of a destination VM and a second destination address of a default gateway, the VMM determines whether the packet can be communicated to the destination VM without the packet being routed by the default gateway. In response to the VMM determining that the packet can be communicated to the destination VM without the packet being routed by the default gateway, the VMM forwards the packet to the destination VM such that the packet bypasses routing by the default gateway.

BRIEF DESCRIPTION OF THE DRAWINGS

FIG. 7 illustrates an exemplary source VMM forwarding a packet between different networks in a virtual networking environment such that a physical next hop router is bypassed;

DETAILED DESCRIPTION OF ILLUSTRATIVE EMBODIMENT

Figure 1:
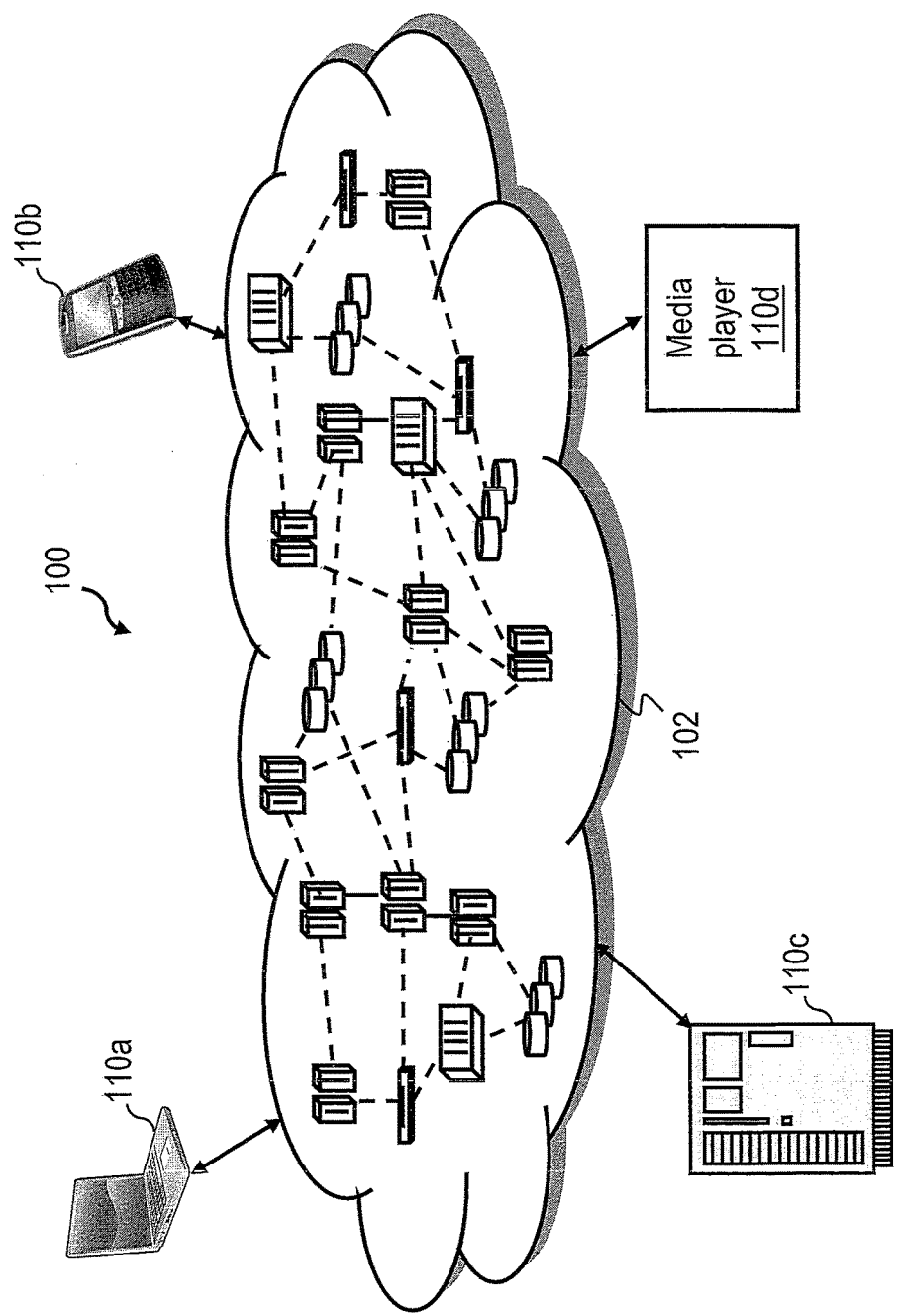
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100, which in the depicted embodiment is a cloud computing environment, includes a collection of computing resources commonly referred to as a cloud 102. Computing resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms and/or software as services accessible to client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and accessing services of computing resources in collection 110 via a packet network.

Figure 2:
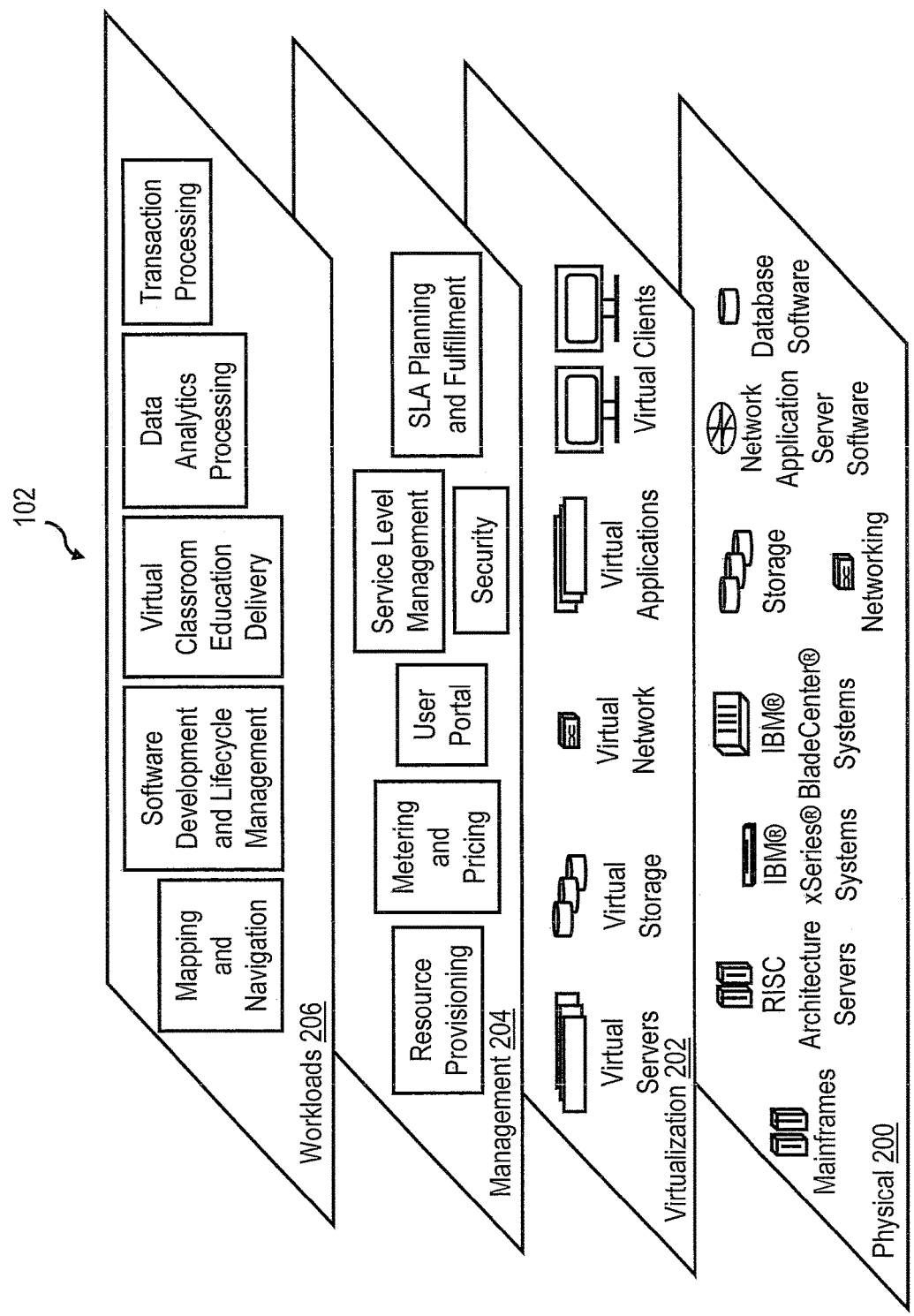
FIG. 2 depicts the layering of virtual and physical resources in the exemplary data processing environment of FIG. 1 in accordance with one embodiment.

FIG. 2 is a layer diagram depicting the virtual and physical resources residing in collection of cloud 102 of FIG. 1 in accordance with one embodiment. It should be understood that the computing resources, layers, and functions shown in FIG. 2 are intended to be illustrative only and embodiments of the claimed inventions are not limited thereto.

As depicted, cloud 102 includes a physical layer 200, a virtualization layer 202, a management layer 204, and a workloads layer 206. Physical layer 200 includes various physical hardware and software components that can be used to instantiate virtual entities for use by the cloud service provider and its customers. As an example, the hardware components may include mainframes (e.g., IBM® zSeries® systems), reduced instruction set computer (RISC) architecture servers (e.g., IBM pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include operating system software (e.g., AIX, Windows, Linux, etc.), network application server software (e.g., IBM WebSphere® application server software, which includes web server software), and database software (e.g., IBM DB2® database software). IBM, zSeries, pSeries, xSeries, BladeCenter, WebSphere, and DB2 are trademarks of International Business Machines Corporation registered in many jurisdictions worldwide.

The computing resources residing in physical layer 200 of cloud 102 are virtualized and managed by one or more virtual machine monitors (VMMs) or hypervisors. The VMMs present a virtualization layer 202 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by client devices 110 of cloud consumers on-demand.

The VMM(s) also support a management layer 204 that implements various management functions for the cloud 102. These management functions can be directly implemented by the VMM(s) and/or one or more management or service VMs running on the VMM(s) and may provide functions such as resource provisioning, metering and pricing, security, user portal services, service level management, and SLA planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 206, which may be implemented by one or more consumer VMs, provides examples of functionality for which the cloud computing environment may be utilized. Examples of workloads and functions which may be provided from workloads layer 206 include: mapping and navigation; software development and lifecycle management; virtual classroom education delivery; data analytics processing; and transaction processing.

Figures 3, 5:
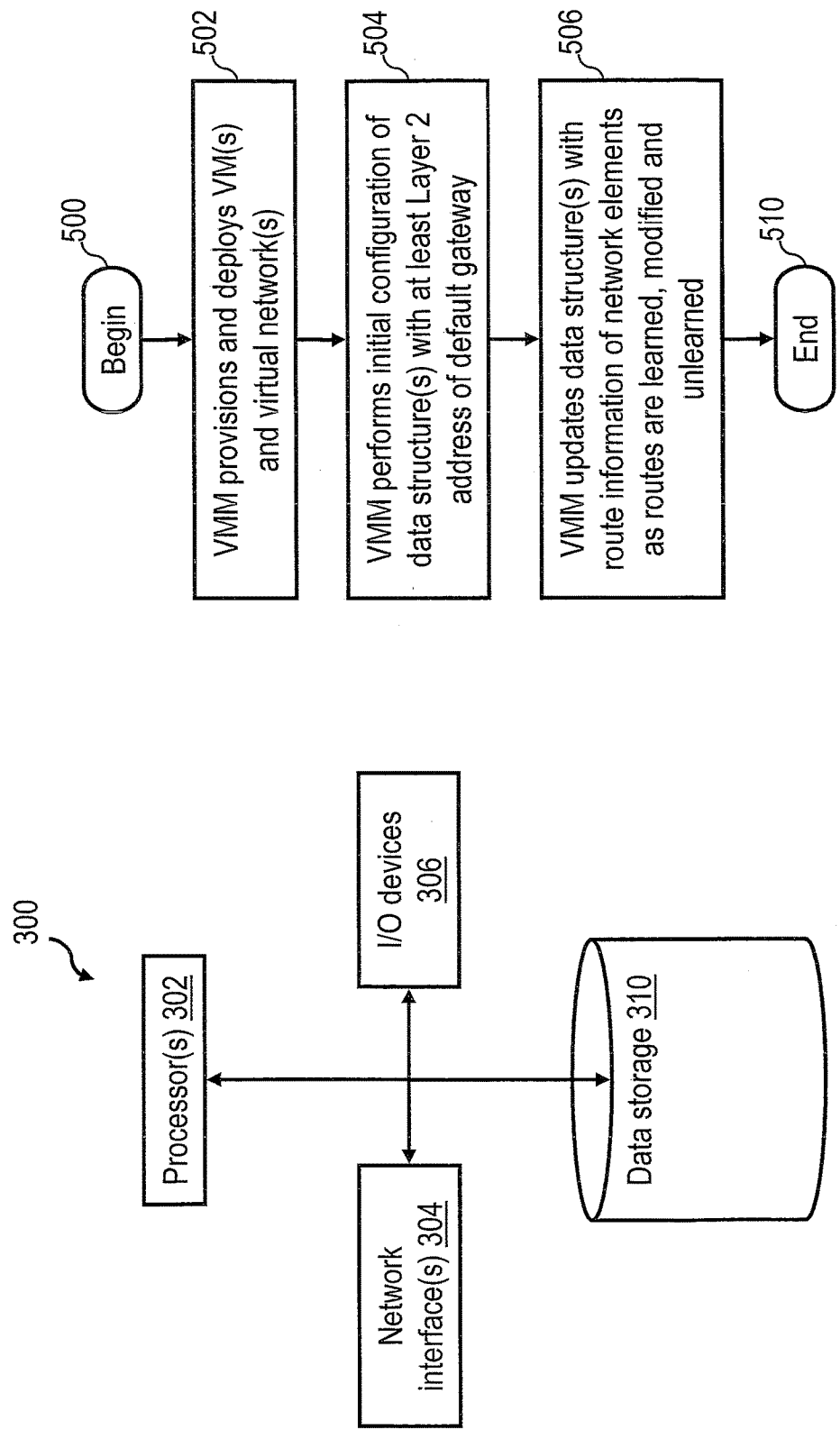
FIG. 3 is a high level block diagram of a data processing system in accordance with one embodiment.
FIG. 5 is a high level logical flowchart of an exemplary method of configuring a virtual networking environment in accordance with one embodiment.

With reference now to FIG. 3, there is illustrated a high level block diagram of an exemplary data processing system 300 that can be utilized to implement a physical host computing platform in physical layer 200 of FIG. 2 or a client device 110 of FIG. 1. In the illustrated exemplary embodiment, data processing system 300 includes one or more network interfaces 304 that permit data processing system 300 to communicate with one or more computing resources in cloud 102 via cabling and/or one or more wired or wireless, public or private, local or wide area networks (including the Internet). Data processing system 300 additionally includes one or more processors 302 that process data and program code, for example, to manage, access and manipulate data or software in data processing environment 100. Data processing system 300 also includes input/output (I/O) devices 306, such as ports, displays, and attached devices, etc., which receive inputs and provide outputs of the processing performed by data processing system 300 and/or other resource(s) in data processing environment 100. Finally, data processing system 300 includes data storage 310, which may include one or more volatile or non-volatile storage devices, including memories, solid state drives, optical or magnetic disk drives, tape drives, etc. Data storage 310 may store, for example, software within physical layer 200 and/or software, such as a web browser, that facilitates access to workloads layer 206 and/or management layer 204.

In utility or cloud computing environments such as that described with reference to FIGS. 1-3, virtual networks are commonly implemented to support communication between VMs. In conventional implementations, network traffic between VMs on different virtual networks has been routed through at least one physical router external to the physical computing platform(s) on which the VMs are running. The requirement that network traffic between different virtual networks be routed through a physical router leads to inefficiency, particularly in cases in which the different virtual networks reside on the same physical computing platform.

Figure 4:
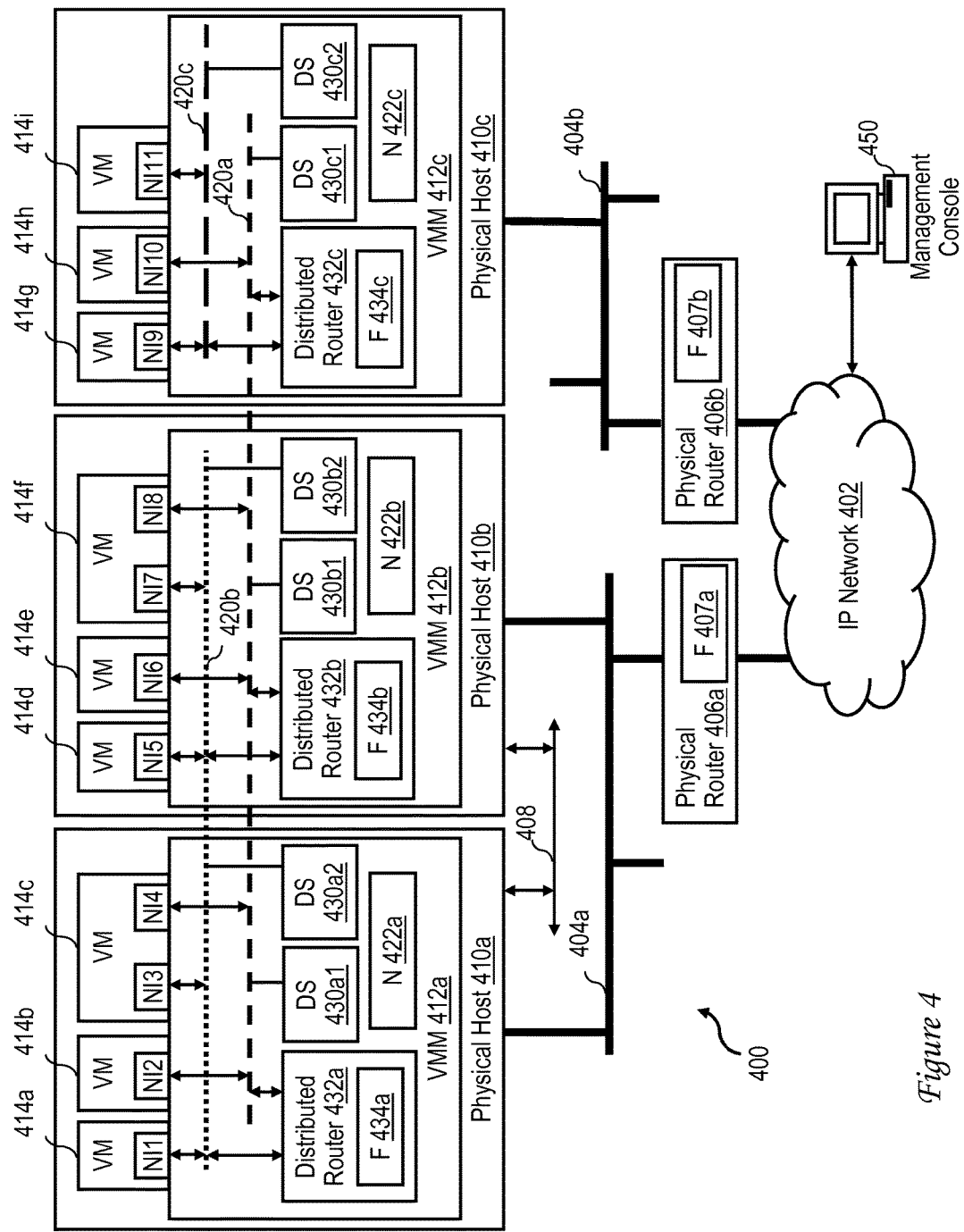
FIG. 4 is a high level block diagram of a portion of a data processing environment employing virtual networking in accordance with one embodiment.

Referring now to FIG. 4, there is depicted a high level block diagram of a portion of a data processing environment 400 employing virtual networking in accordance with one embodiment. For example, data processing environment 400 can implement a portion of cloud 102 depicted in FIG. 1.

In the depicted embodiment, data processing environment 400 includes an Internet protocol (IP) network 402 including a plurality of network segments 404a, 404b, each of which is coupled to a respective one of physical routers 406a, 406b. As is known in the art, each of physical routers 406a, 406b includes a respective forwarding table 407a, 407b by which physical routers 406a, 406b route incoming data packets toward the packets' destinations based upon OSI Layer 3 (e.g., Internet Protocol (IP)) addresses contained in the packets. Physical hosts 410a, 410b are coupled to network segment 404a, and physical host 410c is coupled to network segment 404b. Physical hosts, such as physical hosts 410a, 410b, optionally may be additionally coupled by a secondary host connection 408, such as direct cabling or a private non-routed network. Each of physical hosts 410a-410c can be implemented, for example, utilizing a data processing system 300 as depicted in FIG. 3.

Each of physical hosts 410a-410c executes a respective one of VMM 412a-412c, which virtualizes and manages the resources of its respective physical host 410, for example, under the direction of a human and/or automated cloud administrator at a management console 450 coupled to physical hosts 410a-410c by IP network 402. VMM 412a on physical host 410a supports the execution of VMs 414a-414c, VMM 412b on physical host 410b supports the execution of VMs 414d-414f, and VMM 412c on physical host 410c supports the execution of VMs 414g-414i. In various embodiments, VMs 414a-414i can include VMs of one or more cloud consumers and/or a cloud provider. In the depicted embodiment, each of VMs 414 has at least one (and in some cases multiple) virtual network interfaces NI1-NI11, which provide network connectivity at least at Layers 2 and 3 of the OSI model.

As depicted, each of VMMs 412a-412c provides one or more (and in the depicted embodiment, at least two) virtual networks to which its VMs 414 can attach. To visually distinguish them from physical subnetworks 404a-404b, virtual networks are represented in FIG. 4 in dashed line illustration. For example, in the depicted embodiment, VMMs 412a-412c all provide a first virtual network 420a through the implementation of distributed switches (DSs) 430a1, 430b1 and 430c1 providing Layer 2 connectivity. VMMs 412a-412b similarly provide a second virtual network 420b through the implementation of distributed switches 430a2 and 430b2. In addition, VMM 412c provides a third virtual network 420c through the implementation of distributed switch 430c2. In various embodiments, each of virtual networks 420a-420c can be, for example, a private network of a particular cloud consumer, a collaborative private network shared by multiple cloud consumers and/or a cloud provider, or a public network. In the depicted example, network interfaces NI2, NI4, NI6, NI8, and NI10 are connected to first virtual network 420a, network interfaces NI1, NI3, NI5, and NI7, are connected to second virtual network 420b, and network interfaces NI9 and NI11 are connected to third virtual network 420c. Each VMM 412 preferably records information regarding the virtual network(s) 420 it supports and the connection of its VMs 414 to the virtual network(s) 420 as a respective one of network information 422a, 422b and 422c. For example, a VMM 412 can create an entry in its network information 422a, 422b or 422c for one of its VMs 414 when the VM 414 is provisioned, deployed or migrated in, and can remove the entry when the VM 414 is migrated out or destroyed.

To support communication between virtual networks 420a-420c and between virtual networks 420 and physical networks 402 and/or 404, VMMs 412a-412c each implement a respective one of distributed routers 432a-432c to provide OSI Layer 3 routing. In the depicted embodiment, each distributed router 432 provides a respective network interface for each virtual network 420 instantiated by its VMM 412, as well as a network interface to the physical network segment 404 to which its physical host 410 is attached (e.g., through a software port of a physical network interface 304). Each distributed router 432 additionally includes a respective forwarding table 434a, 434b and 434c for storing route information. In at least one embodiment, the implementation of a distributed router 432 in each VMM 412 supporting a VM 414 having virtual networking capability frees physical routers 406 from having to learn and record in forwarding tables 407 routes to VMs 414, which may migrate frequently among the various physical hosts 410 in data processing environment 400 for performance, load balancing, security, power management and/or other considerations.

In alternate embodiments, a VMM 412 may create a respective instantiation of a distributed router for each of multiple cloud consumers, such that each distributed router instance forwards packets between a given cloud consumer's virtual networks, but not between virtual networks of different cloud consumers. For example, traffic of a first cloud consumer that has been allocated virtual networks 420b and 420c as private networks may be routed by a first distributed router instance, while virtual network 420a, which is allocated to a second cloud consumer and is served by a second distributed router instance, is not accessible via the first distributed router instance.

With reference now to FIG. 5, there is illustrated a high level logical flowchart of an exemplary method of configuring a virtual networking environment in accordance with one embodiment. As with the other logical flowcharts depicted herein, the flowchart given in FIG. 5 depicts steps in logical rather than strictly chronological order. Thus, in at least some embodiments, at least some steps of a logical flowchart can be performed in a different order than illustrated or concurrently. The process illustrated in FIG. 5 can be performed by each VMM 412 in data processing environment 400 of FIG. 4 that deploys a VM 414 having a virtual network interface.

The process begins at block 500 and then proceeds to block 502, which depicts a VMM 412 provisioning and deploying one or more VMs 414 and one or more virtual networks 420, for example, in response to commands received from a cloud administrator via management console 450. The VM(s) 414 and virtual network(s) 420 can include those deployed for a cloud service provider and/or those deployed for one or more cloud consumers. As noted above, VMM 412 preferably configures each deployed VM 414 requiring virtual network connectivity with at least one virtual network interface (e.g., network interfaces NI1-NI11) having respective associated OSI Layer 2 and Layer 3 network addresses. The configuration of virtual networks 420 and network interfaces and the connections therebetween is preferably stored as the relevant one of network information 422a, 422b or 422c.

In addition, at block 504, VMM 412 configures one or more data structures, such as its network information 422, with the Layer 2 address of the default gateway, which may be, for example, that of the physical router 406 of the network segment 404 to which the physical host 410 of the VMM 412 is connected or that of another distributed router 432. In one embodiment, VMM 412 may perform the initial configuration depicted at block 504 in response to a configuration command received from a cloud administrator via management console 450 that directly specifies the OSI Layer 2 (e.g., MAC) address and optionally the OSI Layer 3 (e.g., IP) address of the default gateway. Alternatively, VMM 412 may perform the initial configuration, for example, in response to learning the OSI Layer 2 address of the default gateway from an Address Resolution Protocol (ARP) Reply received from the default gateway in response to an ARP Request of a VM 414 supported by the VMM 412. In yet another embodiment, VMM 412 (e.g., its distributed router 432) may select the OSI Layer 2 (e.g., MAC) address to be used as the default gateway address. To enable mobility, the same OSI Layer 2 address is preferably used as the default gateway address across a given virtual network 420. If desired, a single OSI Layer 2 address may be used as the default gateway address by all virtual networks 420. The default gateway address can be selected by VMM 412 and can be provided to the VMs 414, for example, using an ARP Reply initiated by VMM 412 in response to an ARP Request sent by a VM 414.

As shown at block 506, VMM 412 additionally updates one or more data structures, such as the forwarding table 434 of its distributed router 432, with route information for virtual and physical network elements in data processing environment 400 as routes to the network elements are learned, modified, or unlearned during operation of data processing environment 400. Numerous different techniques may be employed alone or in combination to update forwarding table 434. For example, VMM 412 may update the route information in forwarding table 434 in response to an update command received from a cloud administrator via management console 420 that directly specifies the route information for one or more OSI Layer 3 (e.g., IP) addresses of one or more network elements or that directly specifies a set of OSI Layer 3 addresses, for example, representing a range of IP addresses found in an IP subnet. Alternatively or additionally, VMM 412 may update the route information in forwarding table 434 in response to communication with a centralized route service within data processing environment 400. Alternatively or additionally, VMM 412 may update the route information in forwarding table 434 in response to routes learned utilizing peer-to-peer communication between VMMs 412. Alternatively or additionally, VMM 412 may update the route information in forwarding table 434 through the learning and unlearning processes.

In particular, in the technique disclosed in the above-referenced patent application, a VMM 412 that receives a packet from a source VM 414 can use an unknown network service (such as the multicast network disclosed in the above-referenced patent application and/or a centralized route service and/or peer-to-peer communication between VMMs 412) to route the packet toward a destination for which the appropriate network route is unknown (i.e., not found in distributed router 432). Upon receipt of the packet, the VMM 414 supporting the destination VM 414 forwards a learning request containing route information to the source VMM 412, which causes the source VMM 412 to install an entry containing route information in its distributed router 432. Similarly, if a VMM 412 supporting a destination VM 414 receives a packet that contains incorrect route information for the destination VM 414, the VMM 412 supporting the destination VM 414 can forward an unlearning request to the source VMM 412, which causes the source VMM 412 to update or delete the incorrect route information in the forwarding table 434 of its distributed router 432.

The process depicted in FIG. 5 thereafter ends at block 510.

Figure 6A:
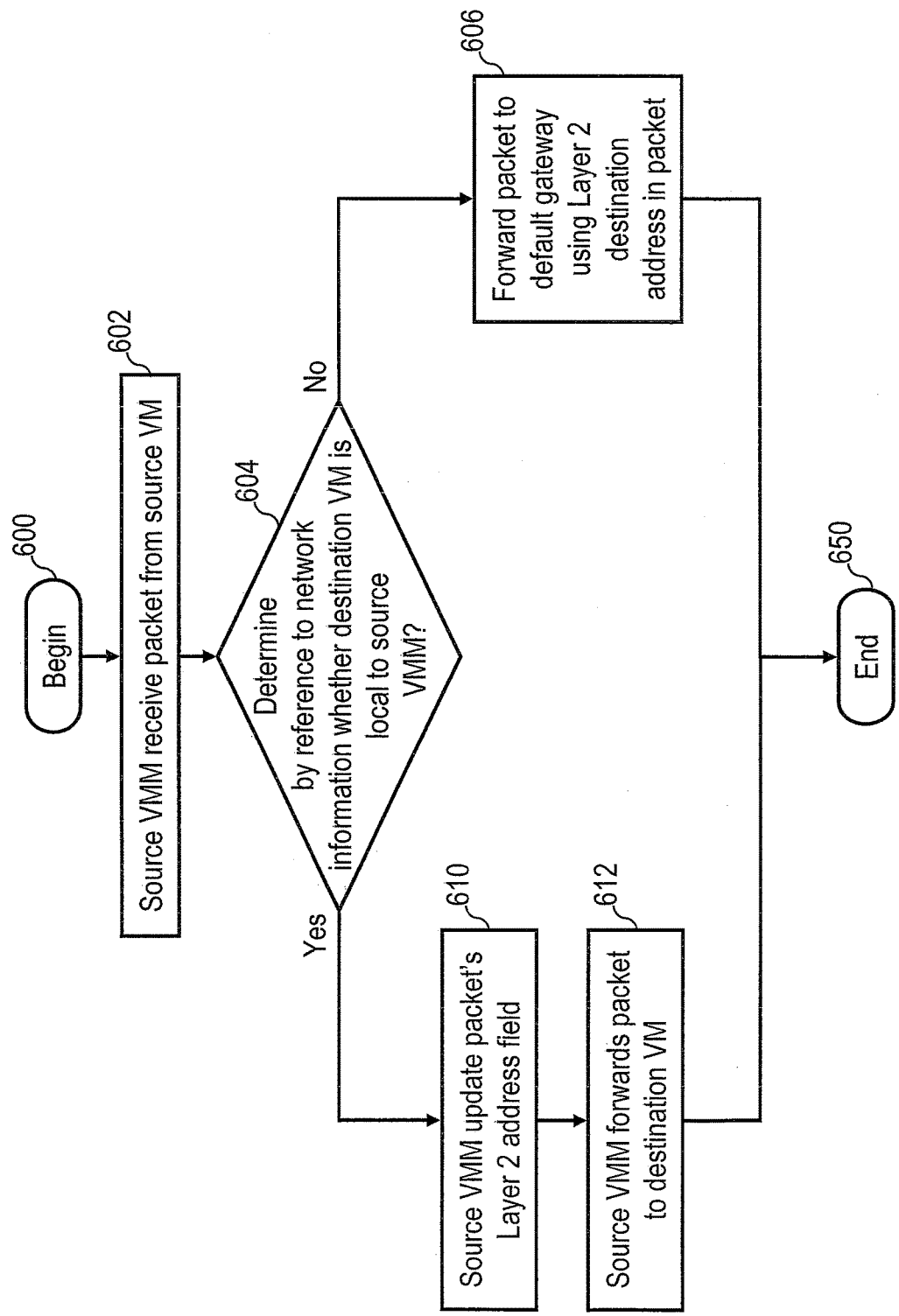
FIG. 6A is a high level logical flowchart of a first exemplary method of packet forwarding in a virtual networking environment in accordance with one embodiment.

Referring now to FIG. 6A, there is depicted a high level logical flowchart of a first exemplary method of packet forwarding in a virtual networking environment in accordance with one embodiment. The process depicted in FIG. 6A can be implemented, for example, by one of VMMs 412 of FIG. 4 to enable the VMM 412 to forward packets between the VMs 414 that it instantiates without traversing the default gateway regardless of the virtual network(s) 420 to which the VMs 414 are connected.

The process shown in FIG. 6A begins at block 600 and then proceeds to block 602, which depicts a source VMM 412 receiving a packet from a source VM 414 instantiated by the source VMM 412. As illustrated in FIG. 7, an exemplary packet 700 includes packet data fields 702 specifying various headers, checksums, protocol options, payload, etc., as well as Layer 2 destination and source address fields 710, 712 and Layer 3 destination and source address fields 720, 722. As shown, Layer 3 destination and source address fields 720 and 722 respectively specify the Layer 3 destination address (L3D) of the physical or virtual network element to which packet 700 is being sent and the Layer 3 source address (L3S) assigned to the sending network interface (e.g., one of network interfaces NI1-NI11) of the source VM 414. L2 destination and source address fields 710 and 712 respectively specify the Layer 2 address (DG) of the default gateway serving the source VM 414 and the Layer 2 source address (L2S) assigned to the sending network interface (e.g., NI1-NI11) of the source VM 414.

Rather than simply forwarding the packet to the default gateway in accordance with Layer 2 destination address field 710, the source VMM 412 determines by reference to its network information 422 whether the Layer 3 destination address 720 of the packet is that of a VM 414 supported by the source VMM 412 (block 604). In response to a negative determination at block 604, the process proceeds to block 606, which depicts VMM 412 forwarding the packet to the default gateway in accordance with L2 destination address field 710. Thereafter, handling of the packet by the source VMM 412 ends at block 650.

If, however, the source VMM 412 makes an affirmative determination at block 604, the process proceeds to block 610. Block 610 illustrates the source VMM 412 updating Layer 2 destination and source address fields 720 and 722. As indicated in FIG. 7, source VMM 412 preferably replaces the Layer 2 address of the source VM 414 in Layer 2 source address field 712 with the Layer 2 address of the default gateway (i.e., DG) to make packet 700 appear that it traversed the default gateway. In addition, source VMM 412 updates L2 destination address field 710 with the Layer 2 address of the destination VM 414 (i.e., L2D). Source VMM 412 then delivers packet 700 directly to the appropriate network interface of the destination VM 414 while bypassing the default gateway (block 612 of FIG. 6A and reference numeral 730 of FIG. 7). It should be appreciated that by bypassing the default gateway, source VMM 412 reduces packet processing and conserves network bandwidth.

For clarity, it should be understood that the methodology depicted in FIG. 6A does not depend upon or require the use of distributed switches (e.g., distributed switches 430 of FIG. 4) that permit a virtual network to span multiple physical hosts 410. Instead, the methodology of FIG. 6A can be performed in a single physical host having a VMM implementing a plurality of standard (i.e., non-distributed) switches (also referred to as soft-switches or software bridges). In such implementations, the VMM implements a router to avoiding transferring traffic between the VMs it instantiates via an external physical router (rather than using the router to route traffic outside its physical host).

Figure 6B:
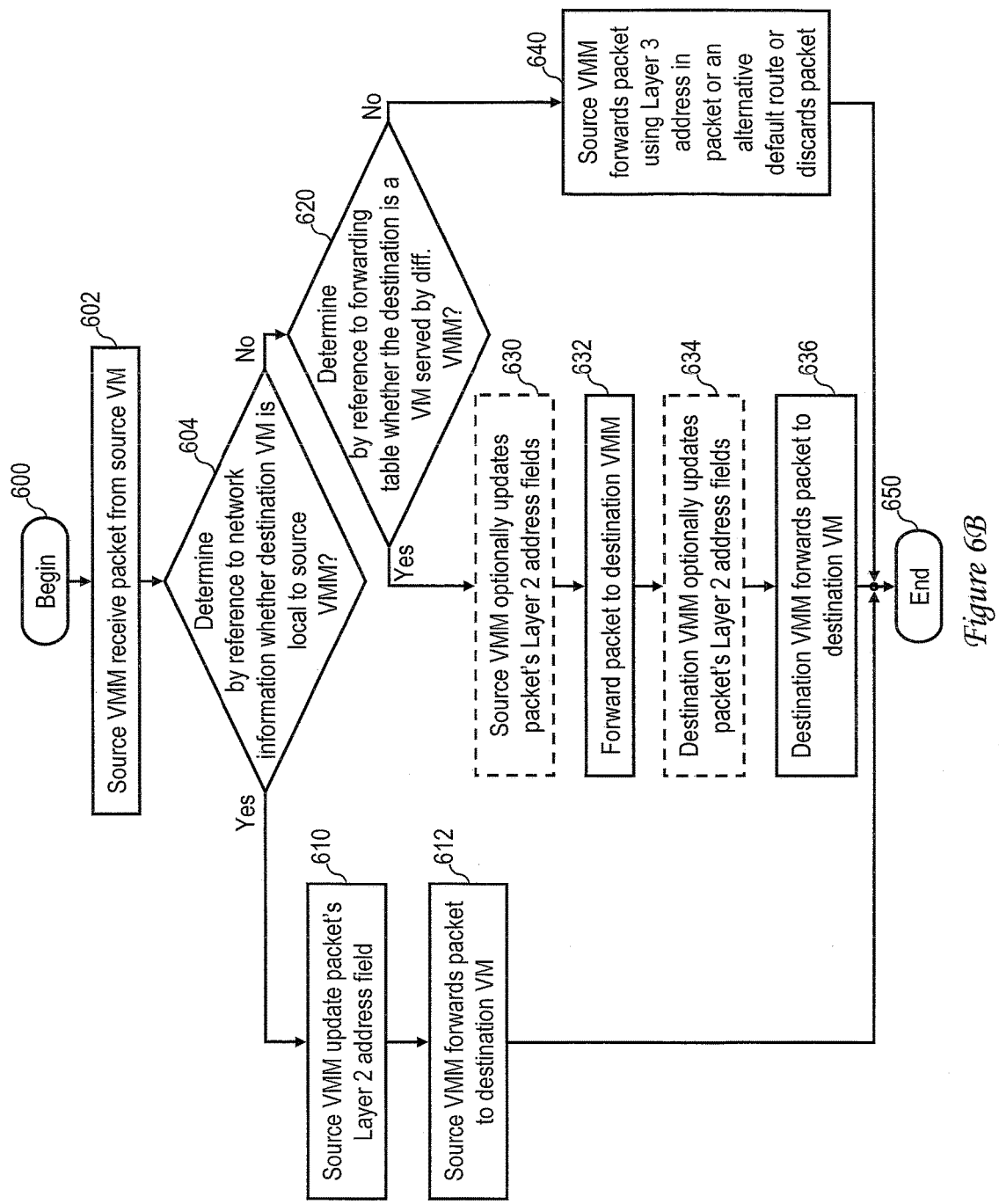
FIG. 6B is a high level logical flowchart of a second exemplary method of packet forwarding in a virtual networking environment in accordance with one embodiment.

Referring now to FIG. 6B, there is illustrated a high level logical flowchart of a second exemplary method of packet forwarding in a virtual networking environment in accordance with one embodiment. The process depicted in FIG. 6B can be implemented, for example, by VMMs 412 of FIG. 4 to enable VMMs 412 to forward packets between source and destination VMs 414 regardless of the physical hosts 410 on which the source and destination VMs 414 reside and the virtual network(s) 420 to which the VMs 414 are connected.

As indicated by the use of like reference numerals, the process of FIG. 6B preferably forwards packets between VMs 414 served by the same VMM 412 as previously described with reference to steps 600, 602, 604, 610 and 612 of FIG. 6A. If, however, the source VMM 412 makes a determination at block 604 of FIG. 6B that the destination of the packet is not a VM 414 served by the source VMM 412, the source VMM 412 makes a further determination by reference to its forwarding table 434 whether or not the destination of the packet is a VM 414 served by a different VMM 412 (block 620).

In one embodiment, forwarding table 434 facilitates the decision depicted at block 620 by indicating, for remote VMMs 412, the identity or address of each such remote VMM 412 or at least a route to reach the remote VMM 412. For physical network elements, forwarding table 434 preferably indicates that the destination is a physical network element and, if needed, route information indicating a default route to forward packets to the physical network element. Forwarding table 434 may further include an option to indicate that a packet specifying a given address should be discarded. (VMM 412 may additionally establish a packet handling definition external to forwarding table 434 specifying a destination address or discard for packets for which routing information is not found in forwarding table 434.)

In response to a negative determination at block 620, the source VMM 412 can be configured to handle the packet in any of a variety of ways, as shown at block 640. For example, the source VMM 412 may be configured to simply discard the packet, for example, based on a packet handling definition external to forwarding table 434. Alternatively, the source VMM 412 may be configured to forward the packet toward the destination utilizing the Layer 3 destination address specified in the packet's Layer 3 destination address field 720 or a default route. Thereafter, handling of the packet by the source VMM 412 ends at block 650.

Returning to block 620, in response to the source VMM 412 determining that the destination of the packet is a VM 414 served by a different destination VMM 412, the process proceeds from block 620 to block 630. Block 630 depicts the source VMM 412 optionally updating the packet's Layer 2 destination and source address fields 720 and 722. As previously described with reference to FIG. 7, source VMM 412 preferably replaces the Layer 2 address of the source VM 414 in Layer 2 source address field 712 with the Layer 2 address of the default gateway (i.e., DG) to make packet 700 appear that it traversed the default gateway. In addition, source VMM 412 updates L2 destination address field 710 with the Layer 2 address of the destination VM 414 (i.e., L2D). Following block 620 and optionally block 630, the source VMM 412 forwards the packet to the destination VMM 412 serving the destination VM 414 (block 632 of FIG. 6B and reference numeral 732 of FIG. 7). The packet forwarding depicted at block 632 can be accomplished in a variety of ways. For example, the source VMM 412 may forward the packet to the destination VMM 412 via a direct connection or a private network, such as secondary host connection 408, for example based upon its forwarding table 434. Alternatively, the source VMM 412 may forward the packet to the destination VMM 412 via one or more of physical networks 402, 404a and 404b utilizing conventional protocol encapsulation in which lower layer protocols encapsulate higher protocol layers of the OSI model. Alternatively, the source VMM 412 may forward the packet to the destination VMM 412 via one or more of physical networks 402, 404a and 404b utilizing a tunneling protocol (e.g., Layer 2 Tunneling Protocol (L2TP)) in which the tunneling protocol encapsulates packet protocol(s) at the same or lower OSI model layer. The information used in the tunneling, including the address of the destination VMM 412 used on the physical network, may be extracted, for example, from forwarding table 434.

Next, as indicated by dashed line illustration, the destination VMM 412 optionally updates the packet's Layer 2 destination and source address fields 720 and 722 (block 634). That is, if the source VMM 412 did not update the packet's Layer 2 destination and source address fields at block 630, the destination VMM 412 preferably replaces the Layer 2 address of the source VM 414 in Layer 2 source address field 712 with the Layer 2 address of the default gateway (i.e., DG) to make packet 700 appear that it traversed the default gateway. In addition, the destination VMM 412 updates L2 destination address field 710 with the Layer 2 address of the destination VM 414 (i.e., L2D). Following optional block 634, if present, the destination VMM 412 forwards the packet to the destination VM 414 by reference to its network information 422, as indicated at block 636 of FIG. 6B and reference numeral 734 of FIG. 7. Thereafter, the process depicted in FIG. 6B ends at block 650.

It should be appreciated that in the processes depicted in FIGS. 6A-6B, packets are forwarded between source and destination VMs 414 by one or more VMMs 412 without physical routers 406a, 406b having to learn and record in their forwarding tables 407a, 407b route information for the VMs 414.

Figure 8:
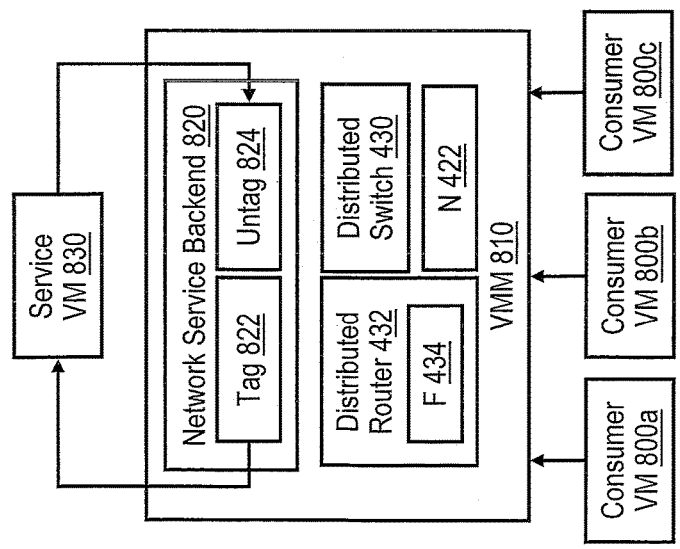
FIG. 8 is a high level block diagram of a VMM that implements a network service backend that tags and untags packets of consumer VMs on multiple different virtual networks in accordance with one embodiment.

A special case of the VM-to-VM communication of packets as described above is the communication of packets from the VMs of cloud consumers to a service VM that provides a packet service, such as security, encryption, statistical analysis, etc., for the packets of the cloud consumers. For example, FIG. 8 illustrates an embodiment in which multiple consumer VMs 800a-800c, which are each associated with a respective one of multiple different cloud consumers, communicate packets to at least one service VM 830, which may be associated with yet another cloud consumer or a cloud service provider. As will be appreciated upon reference to FIG. 4, consumer VMs 800a-800c may run on the same physical platform 410 or different physical platforms 410, and further may run on the same physical platform 410 as, or different physical platform(s) 410 from service VM 830. Consumers VMs 800a-800c can be, and in many implementations will be, associated with respective different virtual networks 420, which may have overlapping address spaces.

As further shown in FIG. 8, a VMM 810 is interposed between consumer VMs 800a-800c and service VM 830. As depicted, VMM 810 may include a distributed switch 430, distributed router 432, and network information 422 as previously described. In addition, VMM 810 preferably includes a network service backend 820 providing tag function 822 and untag function 824. As described further below with reference to FIG. 9, network service backend 820 of VMM 810 tags packets bound for service VM 830 utilizing tag function 822 in order to enable discrimination between packets arriving from different consumer VMs 800. Following provision of service by service VM 830, VMM 810 untags the packets utilizing untag function 824.

Figure 9:
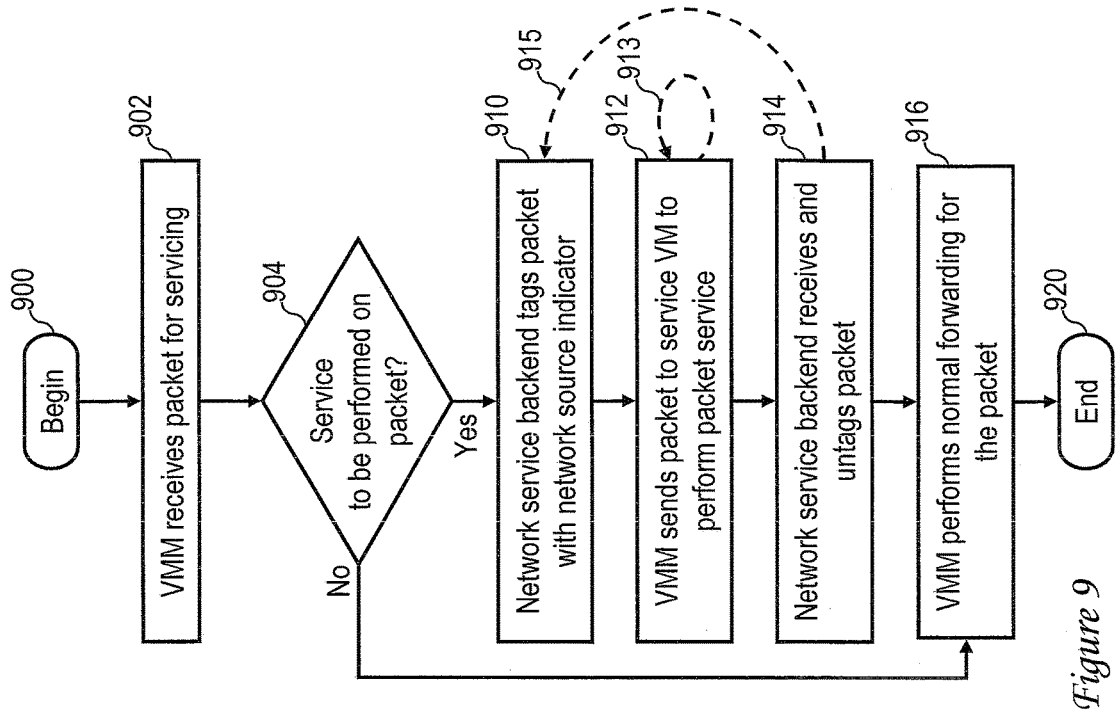
FIG. 9 is a high level logical flowchart of an exemplary method by which a VMM tags and untags packets of consumer VMs on multiple different virtual networks in accordance with one embodiment.

With reference now to FIG. 9, there is illustrated a high level logical flowchart of an exemplary method by which a VMM, such as VMM 810 of FIG. 8, tags and untags packets of consumer VMs 800 on multiple different virtual networks in accordance with one embodiment. The process begins at block 900 and then proceeds to block 902, which depicts VMM 810 receiving a packet sourced from or destined for one of consumer VMs 800a-800c. Because the address domains of virtual networks (e.g., virtual networks 420 of FIG. 4) and the consumer VMs 800 can be partially or fully overlapping, the packet's source addresses (e.g., source addresses 712, 722) and destination addresses (e.g., destination addresses 710, 720) cannot be guaranteed to differentiate packets associated with different VMs, virtual networks and cloud consumers. Consequently, VMM 810 retains an indication of the particular virtual network 420 on which the packet was received and/or the identity (rather than mere address) of a source or destination VM of the packet and/or the cloud consumer with which the source or destination VM or the virtual network is associated. The indication can be based, for example, upon knowledge of VMM 810 regarding the physical or virtual network interface at which the packet was received, which can be augmented by information in network information 422 and/or forwarding table 434.

At block 904, VMM 810 determines whether a service is to be performed on the packet by a service VM, such as service VM 830. VMM 810 may make the determination depicted at block 904, for example, by reference to network information 422 indicating that the consumer VM 800 that is the source or destination VM of the packet has subscribed to the service of service VM 830. In response to a negative determination at block 904, the process passes to block 916, which depicts VMM 810 performing normal packet forwarding for the packet utilizing the knowledge of the virtual network 420 from which the packet was received. Thereafter, the process depicted in FIG. 9 ends at block 920.

Returning to block 904, in response to VMM 810 determining that a service is to be performed for the received packet, VMM 810 processes the packet with network service backend 820. In particular, tag function 822 of network service backend 820 adds a tag to the packet identifying the virtual network from which the packet was received and/or the identity (rather than mere address) of a source or destination VM of the packet and/or the cloud consumer with which the source or destination VM or the virtual network is associated, as depicted at block 910. VMM 810 then sends the packet to service VM 830 in order for the desired service (e.g., encryption, security, analysis, etc.) to be performed for the packet (block 912). As indicated by process loop 913, VMM 810 may optionally have services performed for the packet by multiple different service VMs 830 at block 912. After the service(s) is or are performed by one or more service VM 830, VMM 810 receives the packet back from a service VM 830 and utilizes untag function 824 of network service backend 820 to remove from the packet the tag applied by tag service 822 (block 914). As above, VMM 810 retains information from the removed tag indicating the particular virtual network 420 on which the packet was received and/or the identity (rather than mere address) of a source or destination VM of the packet and/or the cloud consumer with which the source or destination VM or the virtual network is associated. As indicated by process loop 915, which encompasses blocks 910-914, VMM 810 may optionally have services performed for the packet by multiple different service VMs 830, with VMM 810 performing the tagging and untagging steps depicted at blocks 910 and 914, respectively, for each such service.

The process then proceeds from block 914 to block 916. Block 916 depicts VMM 810 utilizing the knowledge from the removed tag of the virtual network 420 from which the packet was originally received and/or the identity (rather than mere address) of a source or destination VM of the packet and/or the cloud consumer with which the source or destination VM or the virtual network is associated to forward the packet, for example, in accordance with the process described in FIG. 6A or 6B (block 916). Thereafter, the process depicted in FIG. 9 ends at block 920.

As has been described, in some embodiments a physical host executes a virtual machine monitor (VMM) that instantiates a source virtual machine (VM). In response to the VMM receiving from the source VM a packet specifying a first destination address of a destination VM and a second destination address of a default gateway, the VMM determines whether the packet can be communicated to the destination VM without the packet being routed by the default gateway. In response to the VMM determining that the packet can be communicated to the destination VM without the packet being routed by the default gateway, the VMM forwards the packet to the destination VM such that the packet bypasses routing by the default gateway.

In at least some embodiments, a physical host executes a virtual machine monitor (VMM) in communication with a plurality of consumer virtual machines (VMs). In response to receipt of a packet, the VMM determines whether a service is to be performed for the packet by a service virtual machine (VM) in communication with the VMM. In response to determining that the service is to be performed for the packet by the service VM, the VMM applies a tag to the packet that differentiates the packet from any other packet sharing a common address with the packet but having a different associated consumer, passes the packet to the service VM for performance of the service, and thereafter removes the tag from the packet in response to receipt of the packet from the service VM following performance of the service. In response to receipt of the packet from the service VM, the VMM forwards the packet.

While the present invention has been particularly shown as described with reference to one or more preferred embodiments, it will be understood by those skilled in the art that various changes in form and detail may be made therein without departing from the spirit and scope of the invention. For example, it should be understood that although the detailed description provided herein provides multiple embodiments of cloud computing environments, the teachings disclosed herein are not limited to cloud computing environments. Rather, embodiments can be implemented in any other type of computing environment now known or later developed, including client-server and peer-to-peer computing environments.

Further, although aspects have been described with respect to computer systems executing program code that direct the functions described herein, it should be understood that embodiments may alternatively be implemented as a program product including a storage medium (e.g., data storage 310) storing program code that can be processed by a data processing system to cause the data processing system to perform one or more of the described functions.

What is claimed is:

1. A data processing system, comprising:
a network interface having a connection to a physical next hop router of an external network;
a processor; and
data storage, coupled to the processor, that includes program code executable by the processor, the program code including a virtual machine monitor (VMM) that when executed causes the data processing system to perform:
instantiating a source virtual machine (VM);
in one or more data structures of the VMM, maintaining (1) address-based route information of network elements including the source VM and at least one physical network element in the external network and (2) additional information identifying one or more destination addresses as belonging to one or more virtual machines to which the VMM can communicate packets without the packets being routed by a default gateway;
in response to the VMM receiving from the source VM a packet specifying a first destination address of a destination VM and a second destination address of the default gateway, said first and second destination addresses being at different network layers, the VMM determining by reference to the first destination address and the additional information whether the packet can be communicated to the destination VM without the packet being routed by the default gateway; and
in response to the VMM determining that the packet can be communicated to the destination VM without the packet being routed by the default gateway, the VMM forwarding the packet to the destination VM such that the packet bypasses routing by the default gateway.

2. The data processing system of claim 1, wherein:
the first destination address is a Layer 3 address; and
the second destination address is a Layer 2 address.

3. The data processing system of claim 2, wherein:
the VMM instantiates the destination VM on the data processing system; and
the source and destination VMs are on different Layer 3 virtual networks supported by the VMM.

4. The data processing system of claim 1, wherein:
the data processing system is a first physical host; and
the destination VM runs on a second physical host.

5. The data processing system of claim 4, wherein:
the network interface is a first network interface;
the data processing system includes a second network interface for a non-routed connection with the second physical host; and
the VMM forwards the packet to the destination VM via the non-routed connection between the first and second physical hosts.

6. The data processing system of claim 4, wherein the forwarding includes forwarding the packet utilizing a tunneling protocol.

7. The data processing system of claim 4, wherein the forwarding includes forwarding the packet utilizing encapsulation.

8. The data processing system of claim 1, wherein the program code further causes the data processing system to perform:
prior to transmission of the packet to the destination VM, updating a source address specified in the packet to an address of the default gateway.

9. The data processing system of claim 1, wherein the program code further causes the data processing system to perform updating the second destination address in the packet to that of the destination VM.

10. The data processing system of claim 1, wherein:
the VMM implements a distributed router having a forwarding table including the route information; and
the VMM forwards the packet to the destination VM by reference to the forwarding table of the distributed router.

11. The data processing system of claim 1, wherein the program code further causes the data processing system to perform:
the VMM recording an address of the default gateway in response to receipt of a message from the default gateway.

12. The data processing system of claim 11, wherein the message is an Address Resolution Protocol (ARP) message.

13. The data processing system of claim 1, wherein the program code further causes the data processing system to perform:
the VMM responding to an Address Resolution Protocol (ARP) request of the source VM by providing the source VM the Layer 2 address of the default gateway.

14. A program product, comprising:
a data storage device; and
program code stored within the data storage device, the data storage device including a virtual machine monitor (VMM) that when executed causes a physical host to perform:
instantiating a source virtual machine (VM);
in one or more data structures of the VMM, maintaining (1) address-based route information of network elements including the source VM and at least one physical network element in the external network and (2) additional information identifying one or more destination addresses as belonging to one or more virtual machines to which the VMM can communicate packets without the packets being routed by a default gateway;
in response to the VMM receiving from the source VM a packet specifying a first destination address of a destination VM and a second destination address of the default gateway, said first and second destination addresses being at different network layers, the VMM determining by reference to the first destination address and the additional information whether the packet can be communicated to the destination VM without the packet being routed by the default gateway; and in response to the VMM determining that the packet can be communicated to the destination VM without the packet being routed by the default gateway, the VMM forwarding the packet to the destination VM such that the packet bypasses routing by the default gateway.

15. The program product of claim 14, wherein:
the first destination address is a Layer 3 address; and
the second destination address is a Layer 2 address.

16. The program product of claim 15, wherein:
the VMM causes the data processing system to instantiate the destination VM on the physical host of the source VM; and
the source and destination VMs are on different Layer 3 virtual networks supported by the VMM.

17. The program product of claim 14, wherein:
the physical host is a first physical host; and
the destination VM runs on a second physical host.

18. The program product of claim 17, wherein the forwarding includes transmitting the packet to the destination VM via a non-routed connection between the first and second physical hosts.

19. The program product of claim 17, wherein the forwarding includes forwarding the packet utilizing a tunneling protocol.

20. The program product of claim 17, wherein the forwarding includes forwarding the packet utilizing encapsulation.

21. The program product of claim 14, wherein the program code further causes the data processing system to perform:
updating a source address specified in the packet to an address of the default gateway.

22. The program product of claim 14, wherein the program code further causes the data processing system to perform updating the second destination address in the packet to that of the destination VM.

23. The program product of claim 14, wherein:
the VMM causes the data processing system to implement in the VMM a distributed router having a forwarding table including the route information; and
the forwarding comprises the VMM forwarding the packet by reference to the forwarding table of the distributed router.

24. The program product of claim 14, wherein the program code further causes the data processing system to perform:
the VMM recording an address of the default gateway in response to receipt of a message from the default gateway.

25. The program product of claim 24, wherein the message is an Address Resolution Protocol (ARP) message.

26. The program product of claim 14, wherein the program code further causes the data processing system to perform:
the VMM responding to an Address Resolution Protocol (ARP) request of the source VM by providing the source VM the Layer 2 address of the default gateway.

* * * * *